United States Patent
Sheldon et al.

(10) Patent No.: US 9,527,252 B2
(45) Date of Patent: Dec. 27, 2016

(54) METHOD OF MAKING EYEWEAR FRAME HAVING SECTIONS JOINED WITH NOSE BRIDGE

(71) Applicants: Brent Sheldon, Montreal (CA); Serge Nadeau, Montreal (CA); Patrick Mainville, Montreal (CA)

(72) Inventors: Brent Sheldon, Montreal (CA); Serge Nadeau, Montreal (CA); Patrick Mainville, Montreal (CA)

(73) Assignee: Brent Sheldon, Miami Beach, FL (US)

( * ) Notice: Subject to any disclaimer, the term of this patent is extended or adjusted under 35 U.S.C. 154(b) by 0 days.

(21) Appl. No.: 14/336,095

(22) Filed: Jul. 21, 2014

(65) Prior Publication Data

US 2016/0016370 A1    Jan. 21, 2016

(51) Int. Cl.
| | | |
|---|---|---|
| B29D 12/02 | (2006.01) | |
| G02C 5/00 | (2006.01) | |
| G02C 5/02 | (2006.01) | |

(52) U.S. Cl.
CPC ............ B29D 12/02 (2013.01); G02C 5/008 (2013.01); G02C 5/02 (2013.01)

(58) Field of Classification Search
CPC ..................................................... B29D 12/02
USPC .................................. 351/41, 124, 135, 178
See application file for complete search history.

(56) References Cited

U.S. PATENT DOCUMENTS

| | | | | |
|---|---|---|---|---|
| 4,886,349 A | * | 12/1989 | Willis ...................... | G02C 3/00 351/111 |
| 4,955,706 A | * | 9/1990 | Schmidthaler ........... | G02C 5/00 351/41 |
| 5,002,625 A | | 3/1991 | Naritomi et al. | |
| 5,617,588 A | | 4/1997 | Canavan | |
| 5,805,261 A | * | 9/1998 | Houston .................. | G02C 1/06 351/124 |
| 5,880,806 A | * | 3/1999 | Conway ................... | G02C 5/02 351/41 |

(Continued)

FOREIGN PATENT DOCUMENTS

| | | |
|---|---|---|
| CA | 2 329 361 | 11/1999 |
| CA | 2 535 302 | 3/2005 |

OTHER PUBLICATIONS

International Search Report for PCT /CA2015/000420 dated Sep. 22, 2015, 5 pages.

(Continued)

*Primary Examiner* — Bumsuk Won
*Assistant Examiner* — Grant Gagnon
(74) *Attorney, Agent, or Firm* — Klintworth & Rozenblat IP LLC

(57) ABSTRACT

A method of making an eyewear frame having substantially rigid sections joined with a soft and/or flexible nose bridge. The substantially rigid sections and soft and/or flexible nose bridge are made in separate molding processes. The cured substantially rigid sections and cured soft and/or flexible nose bridge are then joined together in a further molding process by injecting a bonding material into interfaces between the soft and/or flexible nose bridge and the respective substantially rigid sections. The eyewear frame may be painted. A pre-painting surface treatment may be applied to the soft and/or flexible nose bridge before it is joined with the substantially rigid right and left sections.

20 Claims, 4 Drawing Sheets

(56) References Cited

U.S. PATENT DOCUMENTS

| | | | |
|---|---|---|---|
| 6,056,399 A * | 5/2000 | Jannard | G02C 5/00 351/124 |
| 6,196,681 B1 | 3/2001 | Canavan | |
| 6,435,680 B2 * | 8/2002 | Mocciaro | G02C 5/00 351/131 |
| 6,773,106 B2 | 8/2004 | Herman | |
| 6,969,172 B2 | 11/2005 | Actis-Datta | |
| 7,819,522 B2 | 10/2010 | Sheldon | |
| 8,346,183 B2 | 1/2013 | Prest et al. | |
| 2007/0252942 A1 * | 11/2007 | Collier | G02C 9/00 351/41 |
| 2009/0231544 A1 * | 9/2009 | Mahloch | A61B 3/04 351/246 |
| 2010/0319112 A1 * | 12/2010 | Chiang | A63B 33/002 2/442 |
| 2011/0176101 A1 | 7/2011 | Dighton | |
| 2013/0235327 A1 * | 9/2013 | Atkinson | G02C 5/2209 351/116 |
| 2014/0268003 A1 * | 9/2014 | Scudder | G02C 11/02 351/51 |

OTHER PUBLICATIONS

Written Opinion for PCT/CA2015/000421 dated Sep. 9, 2015, 6 pages.

* cited by examiner

METHOD OF MAKING EYEWEAR FRAME HAVING SECTIONS JOINED WITH NOSE BRIDGE

TECHNICAL FIELD

The described subject matter relates generally to eyewear and, more particularly, to a method of making an eyewear frame having rigid sections joined with a flexible nose bridge.

BACKGROUND OF THE ART

Conventional eyewear generally includes an eyewear frame with a head support apparatus and one or more lenses attached to the frame. For example, the eyewear frame may be made of substantially rigid plastic material and may be configured to define one or more lens openings for releasably engaging one or more lenses with the rigid frame. Such eyewear include a variety of eye glasses, such as sunglasses, protective work glasses, sport goggles, prescription eyewear, etc.

There is a demand for more varieties of eyewear to satisfy new functional requirements and fashion trends. For example, there is a need for eyewear of different styles such as eye glasses with a frame having flexibility to allow the frame curvature to automatically adjust to fit a user's face profile when worn by different users. However, a flexible frame may present issues for secure attachment of the lenses and, in particular for providing a solid support to prescription lenses in order to accurately meet very specific vision requirements. Eyewear having a flexible frame with a rigid lens retainer and a method of making same have been described for example in Applicant's U.S. Pat. No. 7,819, 522. However, further improvement of configurations and production techniques of such eyewear is desirable.

SUMMARY

In one aspect of the described subject matter, there is provided a method of making an eyewear frame for securing a pair of lenses thereto, the method comprising: making separate rigid right and left sections of the eyewear frame using a first molding material in a first molding process, the rigid right and left sections forming separate solid support structures for holding the respective lenses when cured; making a flexible nose bridge separate from the rigid right and left sections of the eyewear frame, using a second molding material in a second molding process, the nose bridge being deformable when cured; and joining the flexible nose bridge with the respective rigid right and left sections using a bonding material in a third molding process to bond the right section, left section and nose bridge together to form the eyewear frame when the bonding material is cured.

A method of making an eyewear frame for securing a pair of lenses thereto, the method comprising: making separate right and left sections of the eyewear frame using a first molding material in a first molding process, the right and left sections forming separate solid support structures for holding the respective lenses when cured; making a nose bridge separate from the right and left sections of the eyewear frame, using a second molding material in a second molding process; applying a pre-paint surface treatment to the nose bridge; joining the nose bridge with the respective right and left sections using a bonding material in a third molding process to bond the right section, left section and nose bridge together to form the eyewear frame when the bonding material is cured.

Optionally, the right section, left section and nose bridge may be painted. A surface treatment may be optionally applied to the nose bridge before the nose bridge is painted.

DESCRIPTION OF THE DRAWINGS

Having thus generally described the nature of the described subject matter, reference will now be made to the accompanying drawing in which.

It will be noted that throughout the appended drawings, like features are identified by like reference numerals.

DETAILED DESCRIPTION

Figure 1:
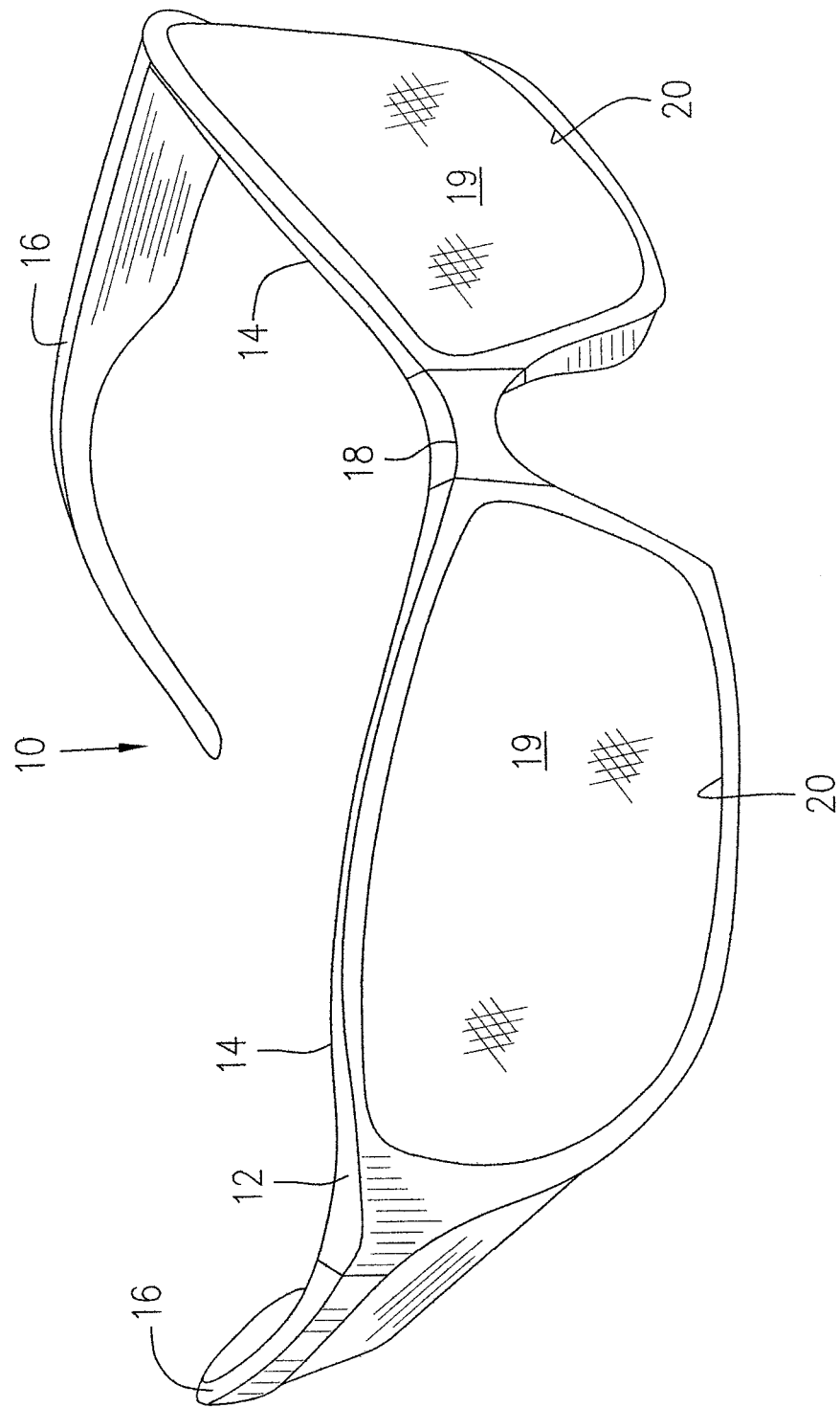
FIG. 1 is a perspective view incorporating one embodiment of the described subject matter.
Figure 4:
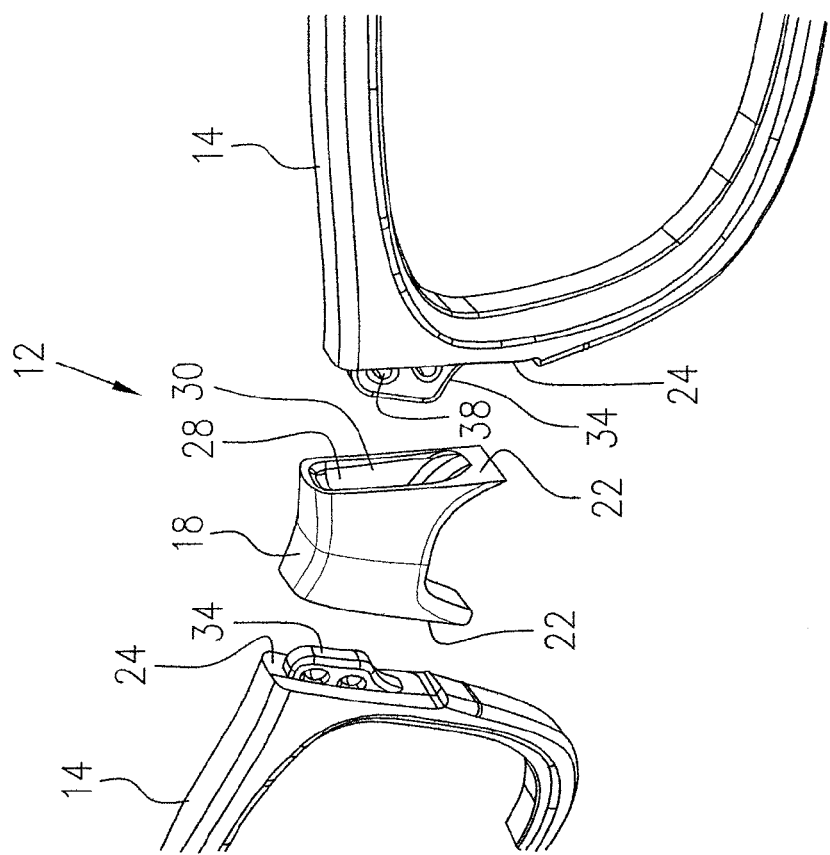
FIG. 4 is a partial perspective exploded view of the hybrid frame of FIG. 2.
Figure 2:
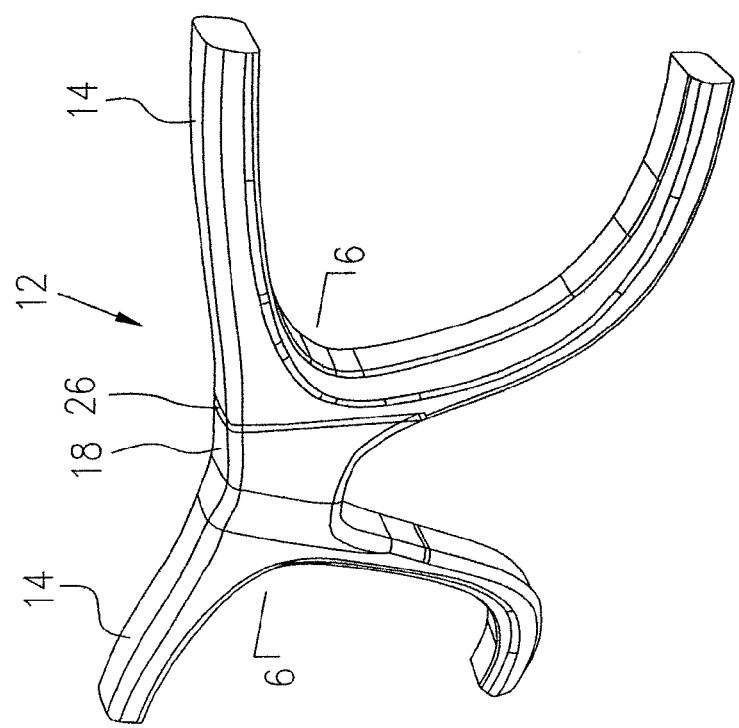
FIG. 2 is a partial perspective view of a hybrid frame of a pair of eye glasses according to the embodiment of FIG. 1, showing in a front view, a flexible nose bridge joining substantially rigid right and left sections of the eye glasses frame.
Figure 5:
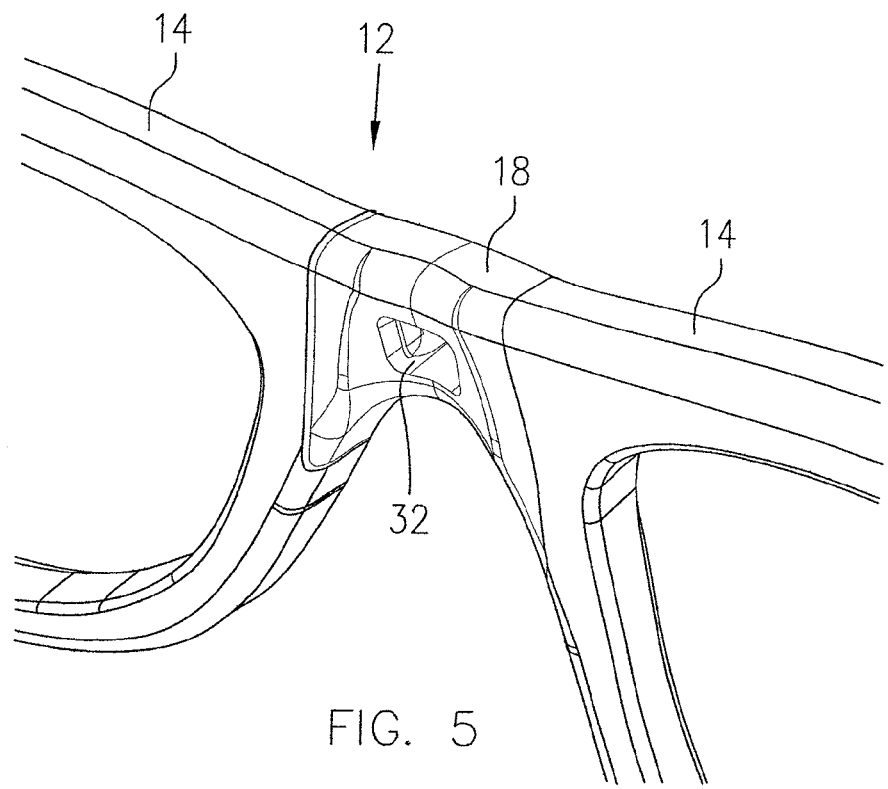
FIG. 5 is a partial perspective view of the hybrid frame similar to the view of FIG. 3, showing the hybrid frame in a manufacturing procedure prior to a joining molding step.
Figure 3:
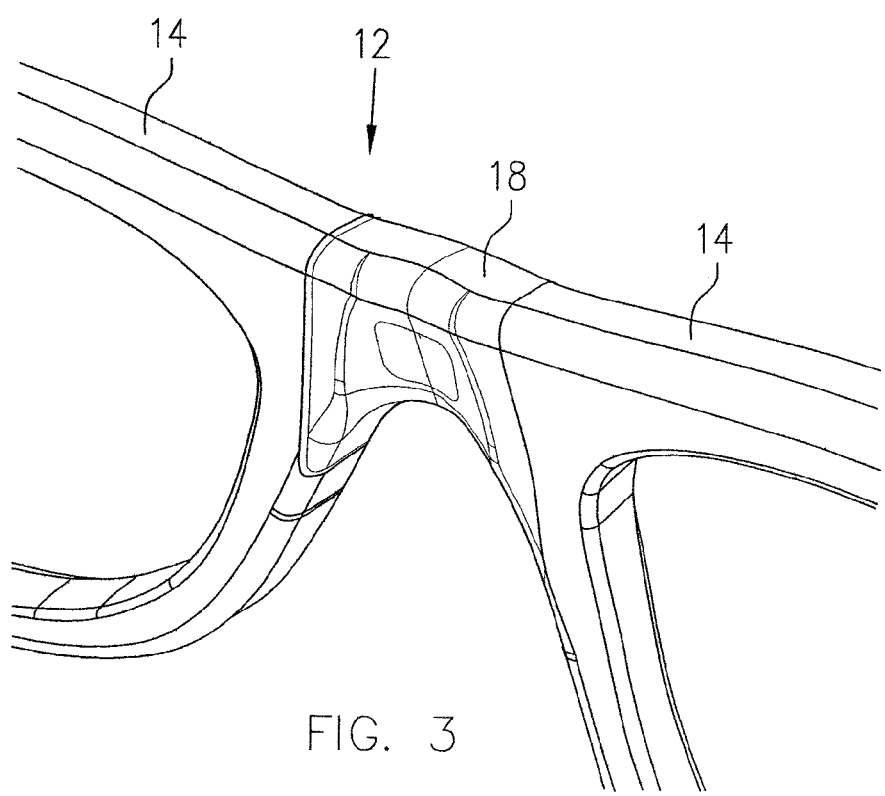
FIG. 3 is a partial perspective view of the hybrid frame of the pair of eye glasses according to the embodiment of FIG. 1, showing in a rear view, the flexible nose bridge joining the substantially rigid right and left sections of the eye glasses frame.

Referring to FIG. 1 which illustrates one embodiment of the described subject matter, eyewear for example, a pair of eye glasses 10 includes a hybrid eye glasses frame 12. The hybrid eye glasses frame 12 in accordance with the embodiment generally includes a pair of right and left sections 14 of substantially rigid plastic material interconnected by a nose bridge 18 of a soft and/or flexible material such as rubber to form at least a front section (not numbered) of the eye glasses 10 when lenses 19 are attached thereto. The substantially rigid plastic right and left sections 14 and the soft and/or flexible nose bridge 18 are made of suitable molding materials in separate molding processes and are then joined together to form a hybrid eye glasses frame 12.

Each of the right and left sections 14 according to this embodiment, may be configured to have a continuous inner peripheral edge 20 to define an opening (not numbered) for receiving the lens 19 which may be removably secured in the opening by clicking into a shallow annular groove (not shown) in the inner peripheral edge 20 which is known in the prior art and will not be further described herein. However, the right and left sections 14 of the hybrid eye glasses frame 12 may have other configurations and the lenses 19 may be attached to the respective right and left sections 14 in other known or unknown manners.

A head support means such as a pair of temples 16 is, for example, pivotally attached to an outer end of the respective right and left sections 14 of the hybrid eye glasses frame 12, and may be made of a molding material similar to or different from the molding material of the substantially rigid plastic right and left sections 14.

The substantially rigid plastic right and left sections 14 provide secure attachment of the lenses 19 thereto and a solid structure for supporting the lenses 19 while the softness and/or flexibility of the nose bridge 18 allows deformation such as bending or twisting such that hybrid eye glasses frame 12 can be automatically adjusted to the contours of multiple users faces.

A manufacturing procedure is now described with reference to FIGS. 1-6. In this manufacturing procedure the substantially rigid right and left sections 14 of the hybrid eye glasses frame 12 and the soft and/or flexible nose bridge 18 are manufactured in separate molding processes. In a first molding process a first molding material in a flowable condition is injected into frame molds (not shown) to make separate right and left sections 14 of the hybrid eye glasses frame 12, the first molding material for example may be a plastic material and becomes substantially rigid when it cures such that the right and left sections 14 of the hybrid eye glasses frame 12 form separate solid support structures for holding the respective lenses 19, such as prescription lenses, as shown in FIG. 1. The right and left sections 14 may be configured with various required features when they are cured in the first molding process. These features will be further described hereinafter.

In a second molding process a second molding material in a flowable condition is injected into a nose bridge mold (not shown) to make the nose bridge 18 which is separate from the right and left sections 14 at this stage, and is used in a further molding process to join the right and left sections 14. The second molding material, for example rubber becomes soft and/or flexible when it cures to thereby provide the deformability of the hybrid eye glasses frame 12. The nose bridge 18 may be configured with various required features when it is cured in the second molding process. These features will be further described hereinafter.

When the substantially rigid right and left sections 14 of the hybrid eye glasses frame 12 and the soft and/or flexible nose bridge 18 have been prepared, a molding joining process can be conducted. For example, the nose bridge 18 may have opposed ends 22 and the respective right and left sections 14 may each have a joining surface 24 at an inner end thereof opposite to the outer end which is pivotally connected with the temples 16 (see FIG. 1). In the third molding process (the molding joining process) the nose bridge 18 may be placed between the right and left sections 14 of the hybrid eye glasses frame 12 such that the opposite ends 22 of the nose bridge 18 are adjacent the respective joining surface 24 of the right and left sections 14 of the hybrid eye glasses frame 12. The desired position of the nose bridge 18 with respect to the right and left sections 14 may be held in place, for example by a jig or other tools or, within a mold (not shown) for this molding joining process in order to allow injecting a bonding material in a flowable state to flow to the interfaces between the nose bridge 18 and the respective right and left sections 14 to thereby bond the three components together when it cures and to finally form the integrated hybrid eye glasses frame 12.

It should be noted that the first molding process may be a general process concept in which the separate substantially rigid right and left sections 14 may be made in one injection of the first molding material or may be made in separate sequential injections of the first molding material.

It should be noted that the first molding process for making the separate substantially rigid right and left sections 14 of the hybrid eye glasses frame 12 and the second molding process for making the nose bridge 18 are conducted independently from each other and therefore, the first and second molding processes need not take place in any particular sequence and either one of the first and second processes can be conducted before the other or at the same time.

It should be noted that the bonding material used in the third molding process (molding joining process) may be the same molding material used in the second molding process for the soft and/or flexible nose bridge 18, or may be the same as the first molding material used in the first molding process for the substantially rigid plastic right and left sections 14 of the hybrid eye glasses frame 12, or may be different from the first and second molding materials, which will be further discussed hereinafter in another embodiment.

According to one embodiment the hybrid eye glasses frame 12 including the right, left sections 14 and nose bridge 18 may be painted. The soft and/or flexible nose bridge 18 is subject to deformation when the eye glasses 10 are in in use, which may cause damage to the paint on the surface of the soft and/or flexible nose bridge 18. Therefore, it is desirable to apply a pre-paint surface treatment to the nose bridge 18 before it is painted, in order to improve the paint's tolerance to bending, twisting or other deformation of the nose bridge 18. For example, a surface etching process may be applied to the nose bridge 18 and then the respective nose bridge 18 and right and left sections 14 are painted before the three components are joined together in the third molding process.

Alternatively, the surface etching process or other surface treatments may be applied to the nose bridge 18 prior to the molding joining process, but the painting of the nose bridge 18 and the substantially rigid right and left sections 14 may be completed after the three components are joined together.

When the nose bridge 18 and the right and left sections 14 are painted separately before they are joined together to form the hybrid eye glasses frame 12, the bonding material appearing along an interface line 26 (see FIG. 2) between the nose bridge 18 and the right section 14 and between the nose bridge 18 and the left section 14 may be left unpainted to provide decorative lines to enhance the esthetic qualities of the eye glasses 10.

According to one embodiment, the soft and/or flexible nose bridge 18 may be configured to have a hollow space 28 therein with an opening 30 at the respective opposed ends 22 (only one opening 30 at one end 22 is shown) of the nose bridge 18 and an aperture 32 (see FIG. 5) for example defined in a back side (facing the user's face) of the nose bridge 18. The aperture 32 may be in communication with the hollow space 28 to allow the bonding material in the third molding process (molding joining process) to be injected through the aperture 32 into the hollow space 28 towards the respective openings 30 to extend to the joining surfaces 24 of the respective right and left sections 14 of the hybrid eye glasses frame 12 when the right and left sections 14 are placed adjacent the opposed ends 22 of the nose bridge 18.

The bonding material injected into the hollow space 28 of the soft and/or flexible nose bridge 18 becomes an internal part of the soft and/or flexible nose bridge 18 when it cures. Therefore, the second molding material such as rubber material used for the soft and/or flexible nose bridge 18 may be used as the bonding material to be filled in the hollow space 28 of the nose bridge 18 in order to ensure the softness and/or flexibility of the soft and/or flexible nose bridge 18 when it is integrally joined with the substantially rigid plastic right and left sections 14 to form the integrated hybrid eye glasses frame 12.

Figure 6:
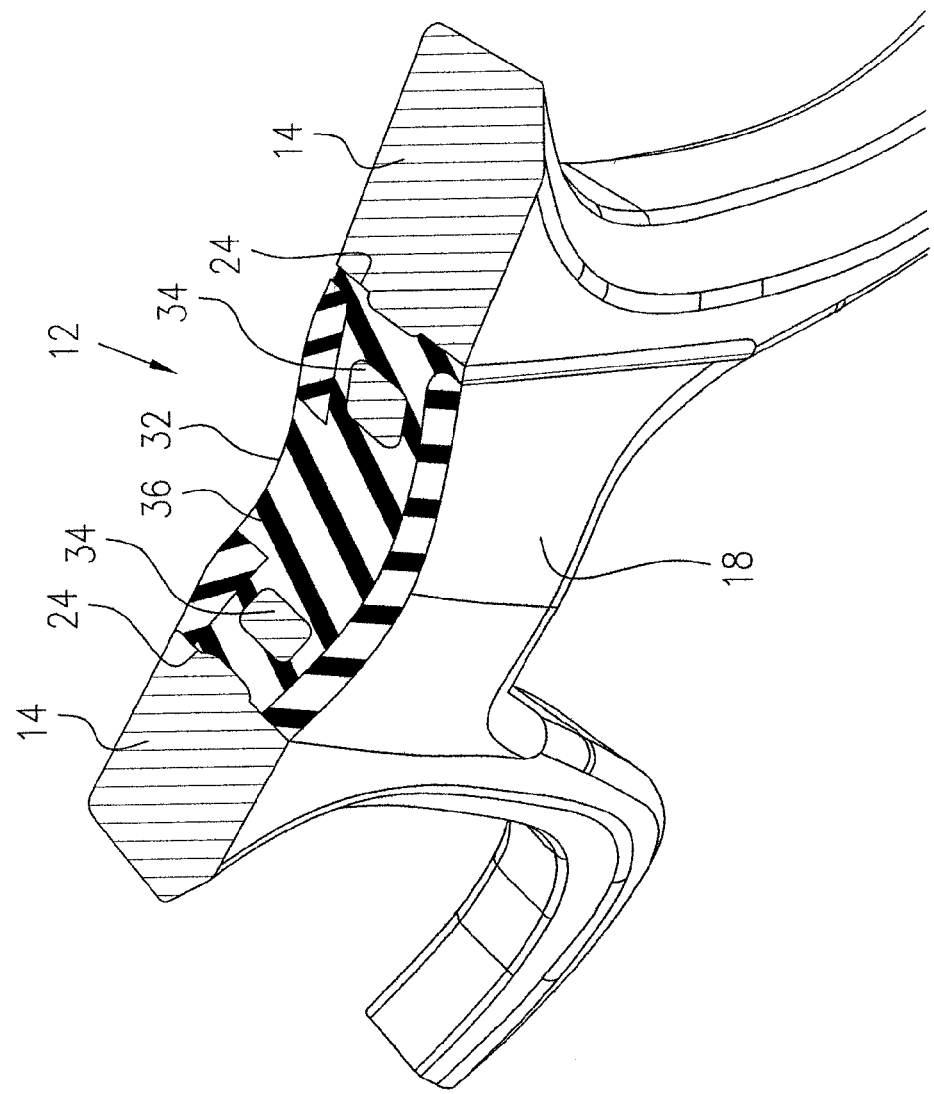
FIG. 6 is a partial perspective view of the hybrid frame with an upper portion cut away along line 6-6 of FIG. 2 to show a cross-section thereof.

Optionally, the right and left sections 14 may be manufactured in the first molding process each with a projecting member protruding from the joining surface 24 of the respective right and left sections 14. For example, the projecting member may be configured as a small tongue 34. In the third molding process (molding joining process) the tongues 34 of the right and left sections 14 may be inserted through the respective openings 30 into the hollow space 28 of the nose bridge 18. The tongues 34 may be substantially smaller in all dimensions thereof than the dimensions of the hollow space 28 in the nose bridge 18 such that the tongues 34 are received within the hollow space 28 of the nose bridge 18 in a loose-fitting condition to form an internal passage 36 around the respective tongues 34. The internal passages 36 may be filled with the bonding material (for example the second molding material for making the soft and/or flexible nose bridge 18) which is injected through the aperture 32 in the back side of the nose bridge 18 and may extend to the joining surfaces 24 of the right and left sections 14, as shown in FIG. 6.

It should be noted that the projecting members such as the tongues 34 may be made integrally with the respective substantially rigid plastic right and left sections 14 such that the tongues 34 are also substantially rigid. Substantially rigid tongues 34 inserted into the hollow space 28 in the soft and/or flexible nose bridge 18 may affect the softness and/or flexibility of the nose bridge 18 when the nose bridge is joined with the right and left sections 14. Therefore, the size of the projection member such as the tongues 34 can be limited with respect to the size of the nose bridge 18 in order to ensure the required softness and/or flexibility provided by the soft and/or flexible nose bridge 18 in the integrated hybrid eye glasses frame 12.

Optionally, the tongues 34 of the respective right and left sections 14 may each be configured to have one or more holes 38 extending therethrough to form part of the internal passage 36 within the nose bridge 18 when the tongues 34 are inserted into the hollow space 28 of the nose bridge 18, to allow the bonding material in the molding joining process to flow therethrough and fill in, thereby further reducing the mass of the substantially rigid material within the soft and/or flexible nose bridge 18.

The above description need not be limited to prescription eye glasses and may be applicable to various types of eyewear such as sunglasses, protective eye glasses or goggles etc.

The described method is generally applicable for making eyewear frames having right and left sections joined by a nose bridge which need a surface treatment separately or differently from that of the right and left sections, regardless of the softness/flexibility of the nose bridge and the rigidity of the right and left sections. Therefore, the eyewear frame may have a nose bridge and right and left sections made from soft/flexible or rigid materials, and may be made from different or the same material, but in separate molding processes.

The above description is meant to be exemplary only, and one skilled in the art will recognize that changes may be made to the embodiments described without departing from the subject matter disclosed. For example, the right and left sections of the frame may be configured differently from the embodiments described and illustrated above. The right and left sections may be configured without an opening to receive the lenses but may be configured to have an elongate upper part to hold the respective lenses by any known or unknown attachment means. Still other modifications which fall within the scope of the described subject matter will be apparent to those skilled in the art, in light of a review of this disclosure, and such modifications are intended to fall within the appended claims.

The invention claimed is:

1. A method of making an eyewear frame for securing a pair of lenses thereto, the method comprising:
   a) making separate rigid right and left sections of the eyewear frame using a first molding material in a first molding process, the rigid right and left sections forming separate solid support structures for holding the respective lenses when cured;
   b) making a flexible nose bridge separate from the rigid right and left sections of the eyewear frame, using a second molding material in a second molding process, the nose bridge being deformable when cured;
   c) inserting the pre-made flexible nose bridge into a space between the pre-formed rigid right and left sections; and
   d) joining the pre-made flexible nose bridge with the respective pre-formed rigid right and left sections using a bonding material in a third molding process to bond the right section, left section and nose bridge together to form the eyewear frame when the bonding material is cured.

2. The method as defined in claim 1, wherein the right section, left section and nose bridge are painted separately prior to the joining step.

3. The method as defined in claim 1, wherein the right section, left section and nose bridge are painted after the joining step.

4. The method as defined in claim 1, wherein step (d) is conducted by injecting the bonding material in a flowable state into an internal passage within the nose bridge to allow the bonding material to flow to interfaces between the nose bridge and the right section, and between the nose bridge and the left sections.

5. The method as defined in claim 1 wherein step (a) and step (b) are conducted independent of each other.

6. The method as defined in claim 1 wherein the first molding material in step (a) is substantially a rigid plastic when cured.

7. The method as defined in claim 1 wherein the second molding material in step (b) is a soft and flexible rubber when cured.

8. The method as defined in claim 1 wherein the third molding material in step (d) is a soft and flexible rubber when cured.

9. The method as defined in claim 1, wherein the right section, left section and nose bridge are painted.

10. The method as defined in claim 9 comprising a step of applying a surface treatment to the nose bridge before the nose bridge is painted.

11. The method as defined in claim 10 wherein the surface treatment of the nose bridge is applied prior to the joining step.

12. The method as defined in claim 10 wherein the surface treatment of the nose bridge is a surface etching process.

13. The method as defined in claim 1, wherein the flexible nose bridge when cured in step (b) defines a hollow space in the nose bridge with an opening at respective opposed ends of the nose bridge and an aperture in the nose bridge in communication with the hollow space, and wherein the bonding material in step (d) is injected through the aperture into the hollow space towards the respective openings to extend to the right and left sections when the right and left sections are placed adjacent the opposed ends of the nose bridge.

14. The method as defined in claim 13, wherein step (a) is conducted to provide the respective right and left sections with a projecting member protruding from a joining surface of the respective right and left sections.

15. The method as defined in claim 14, wherein step (d) is conducted by inserting the projecting member of the right section and the projecting member of the left section through the respective openings into the hollow space of the nose bridge in a loose-fitting condition in order to form an internal passage around the respective projecting members to thereby allow the injected bonding material to fill the internal passages and extend to the joining surfaces of the right and left sections.

16. The method as defined in claim 14, wherein the projecting members of the respective right and left sections each comprise a tongue having one or more holes extending therethrough.

17. A method of making an eyewear frame for securing a pair of lenses thereto, the method comprising:
 a) making separate rigid right and left sections of the eyewear frame using a first molding material in a first molding process, the rigid right and left sections forming separate solid support structures for holding the respective lenses when cured;
 b) making a flexible nose bridge separate from the rigid right and left sections of the eyewear frame, using a second molding material in a second molding process, the nose bridge being deformable when cured;
 c) inserting the pre-made flexible nose bridge into a space between the pre-formed rigid right and left sections; and
 d) joining the pre-made flexible nose bridge with the respective pre-formed rigid right and left sections using a bonding material in a third molding process to bond the right section, left section and nose bridge together to form the eyewear frame when the bonding material is cured, wherein the bonding material used in the third molding process is the second molding material.

18. A method of making an eyewear frame for securing a pair of lenses thereto, the method comprising:
 a) making separate right and left sections of the eyewear frame using a first molding material in a first molding process, the right and left sections forming separate solid support structures for holding the respective lenses when cured;
 b) making a nose bridge separate from the right and left sections of the eyewear frame, using a second molding material in a second molding process;
 c) applying a pre-paint surface treatment to the pre-made nose bridge;
 d) inserting the pre-made and pre-paint nose bridge into a space between the pre-formed right and left sections; and
 e) joining the pre-made nose bridge with the respective pre-formed right and left sections using a bonding material in a third molding process to bond the right section, left section and nose bridge together to form the eyewear frame when the bonding material is cured.

19. The method as defined in claim 18 wherein the first and second molding materials are same.

20. The method as defined in claim 18 comprising a step of painting the respective right section, left section and the nose bridge.

* * * * *